(12) United States Patent
Chang et al.

(10) Patent No.: US 11,582,433 B2
(45) Date of Patent: Feb. 14, 2023

(54) HEAD UP DISPLAY SPECKLE CONTRAST DETERMINATION SYSTEMS AND METHODS

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 17/231,719

(22) Filed: Apr. 15, 2021

(65) Prior Publication Data

US 2022/0337796 A1 Oct. 20, 2022

(51) Int. Cl.
H04N 9/31 (2006.01)
G02B 27/01 (2006.01)

(52) U.S. Cl.
CPC ....... *H04N 9/3182* (2013.01); *G02B 27/0101* (2013.01); *H04N 9/3194* (2013.01); *G02B 2027/014* (2013.01); *G02B 2027/0138* (2013.01)

(58) Field of Classification Search
USPC ............................................................. 345/7
See application file for complete search history.

(56) References Cited

U.S. PATENT DOCUMENTS

| | | | |
|---|---|---|---|
| 10,880,529 B2 | 12/2020 | Chang et al. | |
| 2008/0204834 A1* | 8/2008 | Hill | G06Q 30/0601 |
| | | | 359/9 |
| 2011/0310303 A1* | 12/2011 | Marcus | G03B 21/567 |
| | | | 348/E9.037 |
| 2011/0310478 A1* | 12/2011 | Silverstein | G03B 33/16 |
| | | | 977/774 |
| 2016/0357094 A1* | 12/2016 | Ishii | G02B 27/425 |
| 2019/0086316 A1* | 3/2019 | Rice | G01N 15/0227 |
| 2020/0033623 A1* | 1/2020 | Kyosuna | H04N 9/3102 |
| 2020/0137362 A1* | 4/2020 | Damberg | H04N 9/3126 |
| 2020/0326655 A1* | 10/2020 | Chang | H04N 9/3161 |
| 2021/0132404 A1* | 5/2021 | Harden | G02F 1/134309 |
| 2021/0181519 A1* | 6/2021 | Uhlendorf | G02B 27/1006 |
| 2021/0181522 A1* | 6/2021 | Chang | G02F 1/13306 |
| 2022/0244558 A1* | 8/2022 | Kurashige | G02B 27/48 |

OTHER PUBLICATIONS

U.S. Appl. No. 17/004,249, filed Aug. 27, 2020, Seder et al.
Kubota S, Goodman J. Very efficient speckle contrast reduction realized by moving diffuser device. Appl. Opt. 2010; 49(23): 4385-4391.
Publication titled "Optical Speckle Mitigation"—Disclosed Anonymously in Research Disclosure; digital publication: Jan. 22, 2021; paper publication: Feb. 2021; Questel Ireland Ltd, Killernan, Kilmaine, County Mayo, Ireland.

* cited by examiner

*Primary Examiner* — Chineyere D Wills-Burns (57) ABSTRACT

A system for measuring speckle contrast includes: a head up display (HUD) system configured to output a predetermined image and having a first pixels per degree (PPD); an imaging colorimeter: having a field of view; positioned such that the predetermined image is in the field of view; having a second PPD that is at least 2.2 times greater than the first PPD of the HUD system; and configured to capture an image including the predetermined image; and a speckle contrast module configured to determine a speckle contrast of the HUD system based on the image.

20 Claims, 7 Drawing Sheets

HEAD UP DISPLAY SPECKLE CONTRAST DETERMINATION SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to display systems and methods for vehicles and more particularly to systems and methods for characterizing speckle contrast of head up display systems of vehicles.

A driver of a vehicle traditionally views surroundings of a vehicle through windows, windshields, and other glass of the vehicle. The driver may control vehicle acceleration, deceleration, and steering based on the driver's visual observation of the surroundings of the vehicle.

A vehicle may include one or more displays that display various information. For example, some vehicles include an infotainment system that includes a display that displays various infotainment and other vehicle information. A vehicle may also include a head up display (HUD) that displays information by forming a virtual image at a certain distance with reflection of a windshield. For example, the HUD may display a vehicle speed and other vehicle information.

SUMMARY

In a feature, a system for measuring speckle contrast includes: a head up display (HUD) system configured to output a predetermined image and having a first pixels per degree (PPD); an imaging colorimeter: having a field of view; positioned such that the predetermined image is in the field of view; having a second PPD that is at least 2.2 times greater than the first PPD of the HUD system; and configured to capture an image including the predetermined image; and a speckle contrast module configured to determine a speckle contrast of the HUD system based on the image.

In further features, the imaging colorimeter is configured to capture the image using an aperture value of F/8.

In further features, the imaging colorimeter is configured to capture the image using an exposure time of 50 milliseconds (ms).

In further features, a region of interest (ROI) module is configured to determine a ROI in the image, where the speckle contrast module is configured to determine the speckle contrast within the ROI.

In further features, an intensity module is configured to determine intensities of pixels, respectively, within the ROI of the image, where the speckle contrast module is configured to determine the speckle contrast based on the intensities.

In further features: an average module is configured to determine an average of the intensities; and a standard deviation module is configured to determine a standard deviation of the intensities, where the speckle contrast module is configured to determine the speckle contrast based on the average and the standard deviation.

In further features, the speckle contrast module is configured to set the speckle contrast based on the standard deviation divided by the average.

In further features, the speckle contrast module is configured to: determine whether the speckle contrast value is less than a predetermined value; and store an indicator in memory based on the determination.

In further features, an intensity module is configured to determine intensities of bins of multiple pixels, respectively, within the ROI of the image, where the speckle contrast module is configured to determine the speckle contrast based on the intensities.

In further features, the HUD system is configured to output the predetermined image in one of: only monochrome green; and only another monochromatic wavelength.

In further features, the HUD system includes one or more lasers used to generate the predetermined image.

In a feature, a method for measuring speckle contrast includes: by a head up display (HUD) system, outputting a predetermined image, the HUD system having a first pixels per degree (PPD); positioning an imaging colorimeter such that the predetermined image is in a field of view of the imaging colorimeter, where the imaging colorimeter has a second PPD that is at least 2.2 times greater than the first PPD of the HUD system; capturing an image including the predetermined image using the imaging colorimeter; and determining a speckle contrast of the HUD system based on the image.

In further features, the method further includes capturing the image using the imaging colorimeter with an aperture value of F/8.

In further features, the method further includes capturing the image using the imaging colorimeter with an exposure time of 50 milliseconds (ms).

In further features, the method further includes determining a region of interest (ROI) in the image, where determining the speckle contrast includes determining the speckle contrast within the ROI.

In further features, the method further includes determining intensities of pixels, respectively, within the ROI of the image, where determining the speckle contrast includes determining the speckle contrast based on the intensities.

In further features, the method further includes: determining an average of the intensities; and determining a standard deviation of the intensities, where determining the speckle contrast includes determining the speckle contrast based on the average and the standard deviation.

In further features, determining the speckle contrast includes setting the speckle contrast based on the standard deviation divided by the average.

In further features, the method further includes: determining whether the speckle contrast value is less than a predetermined value; and storing an indicator in memory based on the determination.

In further features, where outputting the predetermined image includes outputting the predetermined image in one of: only monochrome green; and only another monochromatic wavelength.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may also include a holographic head up display (HUD) that includes spatial light modulators that modulate light output by lasers, respectively, before the light is output for view by a driver. A lens may combine the modulated light and output light to a diffuser. Constructive and destructive interference, however, may create speckles in a holographic image produced by the HUD.

Speckle generation is a concern for laser-based HUDs. There is no standard for speckle contrast measurement/determination. Different entities (e.g., companies) may use different imaging equipment and at different locations for speckle contrast measurement, which may lead to different speckle contrast measurements for the same HUD.

The present application involves systems and methods for consistent speckle contrast measurement in different locations and using different imaging equipment. Speckle contrast measurement is performed using an imaging colorimeter having a pixels per degree (PPD) that is at least 2.2 times greater than a PPD of the HUD. With consistent imaging equipment characteristics, settings, exposure time, PPD, and wavelength, speckle contrast measurement is achieved at different locations.

Figure 1:
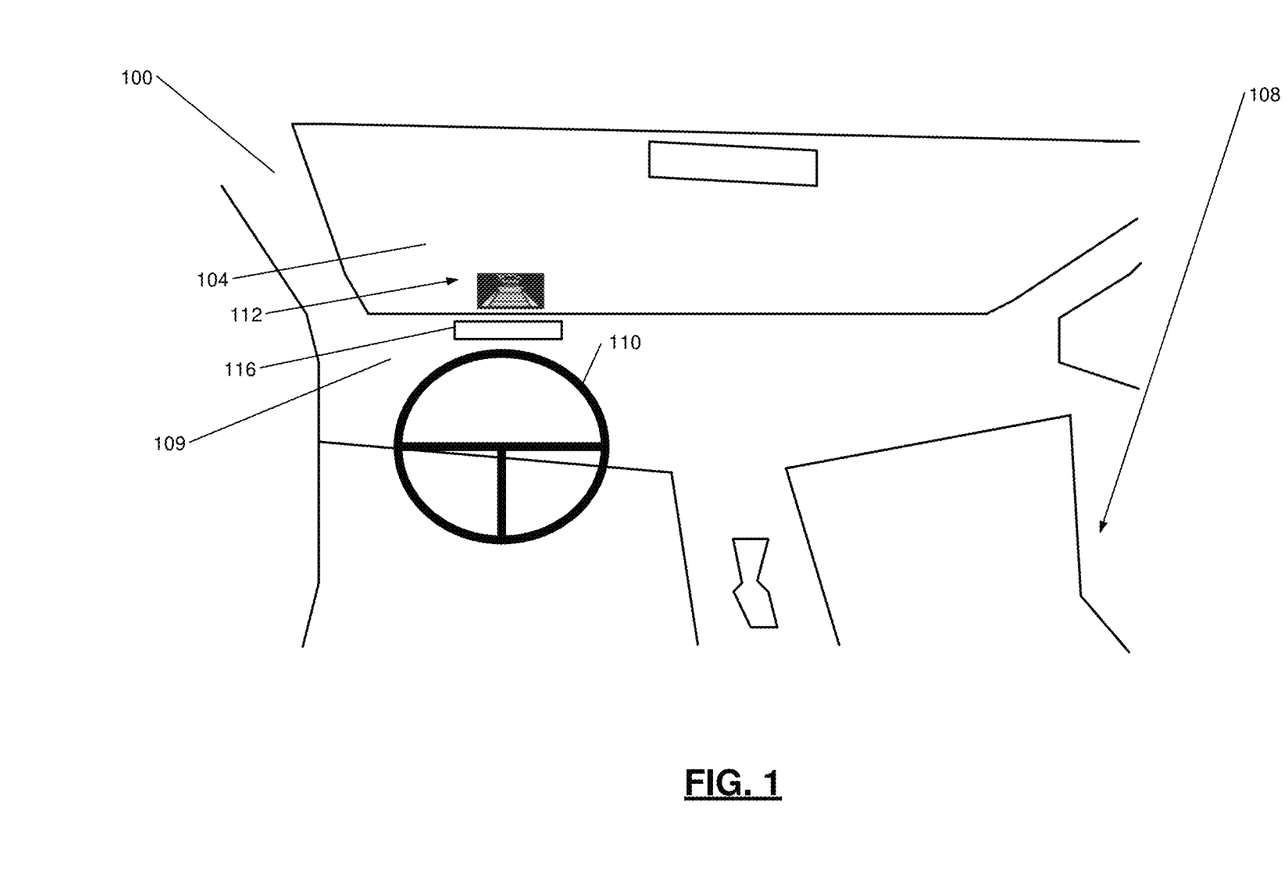
FIG. 1 includes an example perspective view from a driver seat of a vehicle.

FIG. 1 includes an example perspective view from a driver seat of a vehicle 100. The vehicle 100 includes a windshield 104 located in a front opening of the vehicle 100.

Passengers within a passenger cabin 108 of the vehicle 100 can look through the windshield 104 to see in front of the vehicle 100. While the example of a land-based vehicle is described, the present application is also applicable to air-based vehicles (e.g., airplanes, helicopters, etc.) and water-based vehicles (e.g., boats, etc.). Also, while the example of a vehicle is provided, the present application is also applicable to non-vehicle implementations including a HUD.

As shown in FIG. 1, the windshield 104 is visually located above a dashboard 109 of the vehicle 100. The vehicle 100 may include a steering wheel 110. The vehicle 100 may be an autonomous vehicle, a semi-autonomous vehicle, or a non-autonomous vehicle. In autonomous vehicles, the steering wheel 110 may be omitted.

A head up display (HUD) system 200 as discussed further below projects a hologram 112 onto a portion of the windshield 104 through an aperture 116 in the dashboard 109. The hologram 112 includes various vehicle information, such as a present speed of the vehicle 100, a present gear of a transmission of the vehicle 100, an engine speed, a directional heading of the vehicle 100, present infotainment system settings, and/or other vehicle information. The hologram 112 presents data to the driver of the vehicle without the driver having to look away from objects in front of the vehicle. While the example of a hologram is provided and will be discussed, the present application is also applicable to images, graphics, etc.

Figure 2:
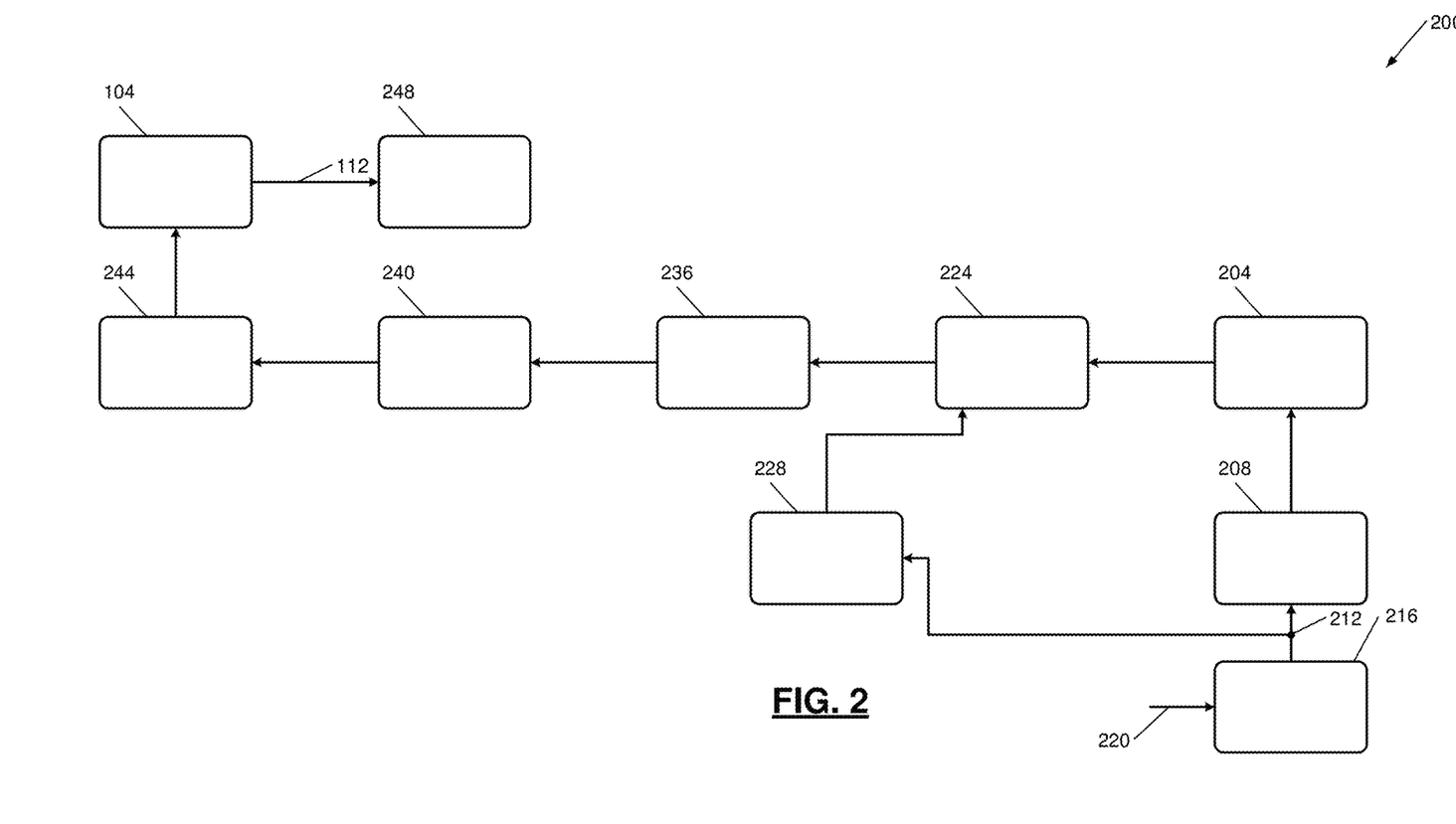
FIG. 2 includes an example implementation of a head up display (HUD) system.

FIG. 2 includes an example implementation of the HUD system 200. The HUD system 200 includes lasers 204, such as a laser that outputs red light, a laser that outputs green light, and a laser that outputs blue light. A laser control module 208 controls a duty cycle of signals applied to the lasers 204 and current through the lasers 204 based on a target hologram 212 to be projected onto the windshield 104. The HUD system 200 can be a single plane HUD system configured to output light on a single vertical plane or a dual plane HUD system configured to output light on two vertical planes. In various implementations, the HUD system 200 may be configured to output light on more than two vertical planes.

A HUD control module 216 generates the target hologram 212 based on vehicle data 220. The HUD control module 216 may obtain the vehicle data 220, for example, from a communication bus of the vehicle 100. The vehicle data 220 may include, for example, the present speed of the vehicle 100, the present gear of the transmission of the vehicle 100, the present engine speed, the present directional heading of the vehicle 100, the present infotainment system settings, and/or the other vehicle information. Under some circumstances, the HUD control module 216 generates the target hologram 212 as a predetermined hologram for speckle contrast measurement, as discussed further below.

Spatial light modulators 224 modulate light output from the lasers 204, respectively. The spatial light modulators 224 may include liquid crystal on silicon (LCoS) panels, a microelectromechanical (MEMs) spatial light modulators, or another suitable type of spatial light modulator.

A modulator control module 228 applies power to the spatial light modulators 224 at a predetermined duty cycle and based on the target hologram 212. For example, the modulator control module 228 may apply power to the spatial light modulators 224 for a first predetermined period then disconnect the spatial light modulators 224 from power for a second predetermined period. The modulator control module 228 may then apply power to the spatial light modulator 224 for the first predetermined period. The first predetermined period and the second predetermined period together define a predetermined period of the predetermined duty cycle. The spatial light modulators 224 encode phase holograms for holographic projection.

The modulator control module 228 may also control application of power to heaters of the spatial light modulators 224, respectively. The modulator control module 228 may apply power to the heater of a spatial light modulator when the temperature of that spatial light modulator is less than a predetermined image quality (IQ)) temperature. The heaters may warm the spatial light modulators when the heaters are on, respectively.

A lens 236 (e.g., an x cube or pyramidal lens) may combine the light output from the lasers 204 through the spatial light modulators 224, respectively. A diffuser 240 may diffuse light output from the lens 236. A mirror 244 or another suitable type of reflector may reflect light output from the diffuser 240 onto the windshield 104. The windshield 104 reflects light into an eye box 248 through which light from the HUD system 200 is visible by a driver of the vehicle 100.

Figure 3:
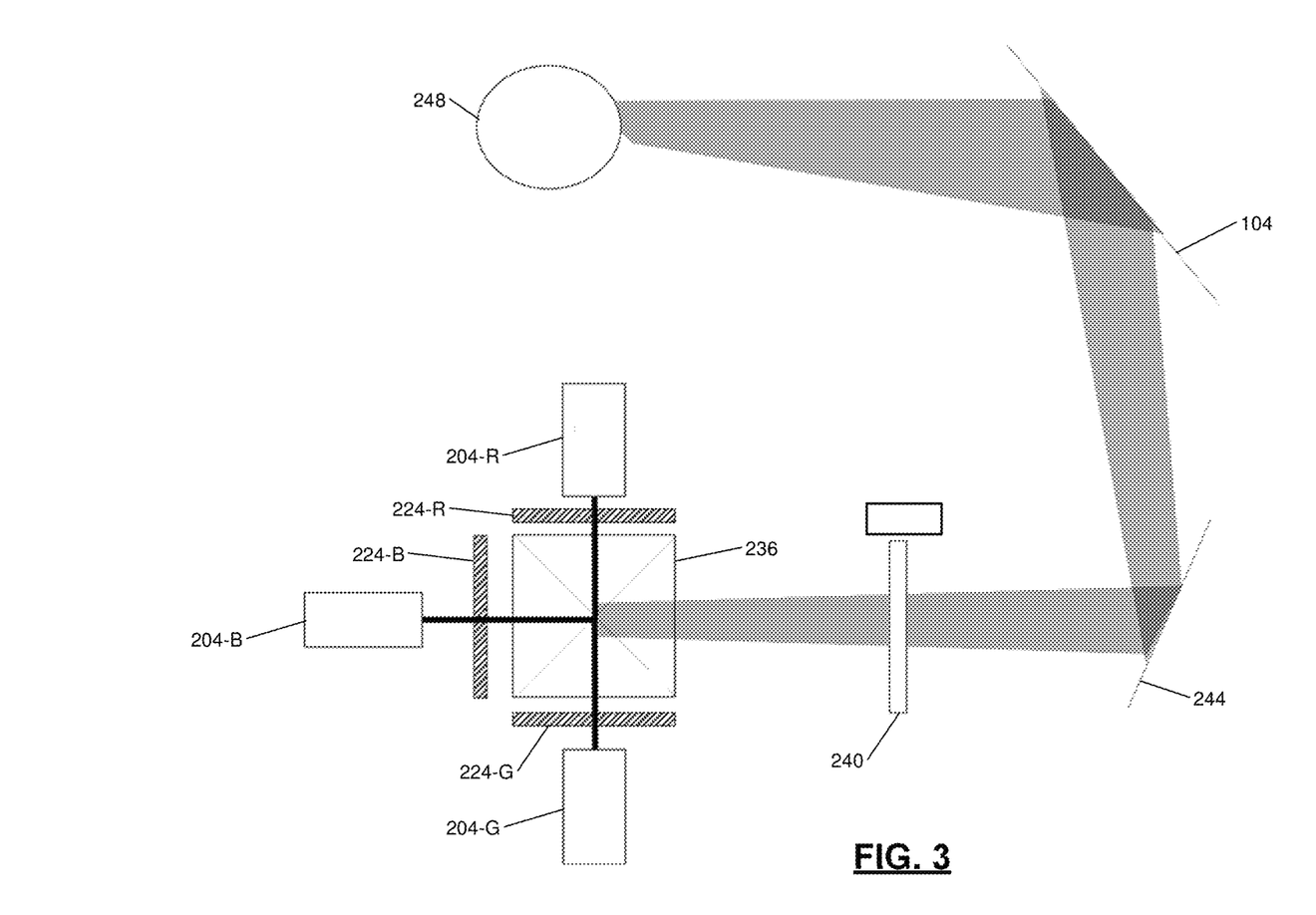
FIG. 3 is another functional block diagram of the HUD system of FIG. 2.

FIG. 3 is another functional block diagram of the HUD system 200 of FIG. 2. The HUD system 200 may include a red laser 204-R that outputs red light and a red spatial light modulator 224-R that modulates light output from the red laser 204-R. The red spatial light modulator 224-R includes an LCoS panel, a MEMS spatial light modulator, or another suitable type of spatial light modulator. A blue laser 204-B outputs blue light, and a blue spatial light modulator 224-B modulates light output from the blue laser 204-B. The blue spatial light modulator 224-B includes an LCoS panel, a MEMS spatial light modulator, or another suitable type of spatial light modulator. A green laser 204-G outputs green light, and a green spatial light modulator 224-G modulates light output from the green laser 204-G. The green spatial light modulator 224-G includes an LCoS panel, a MEMS spatial light modulator, or another suitable type of spatial light modulator.

Figure 4:
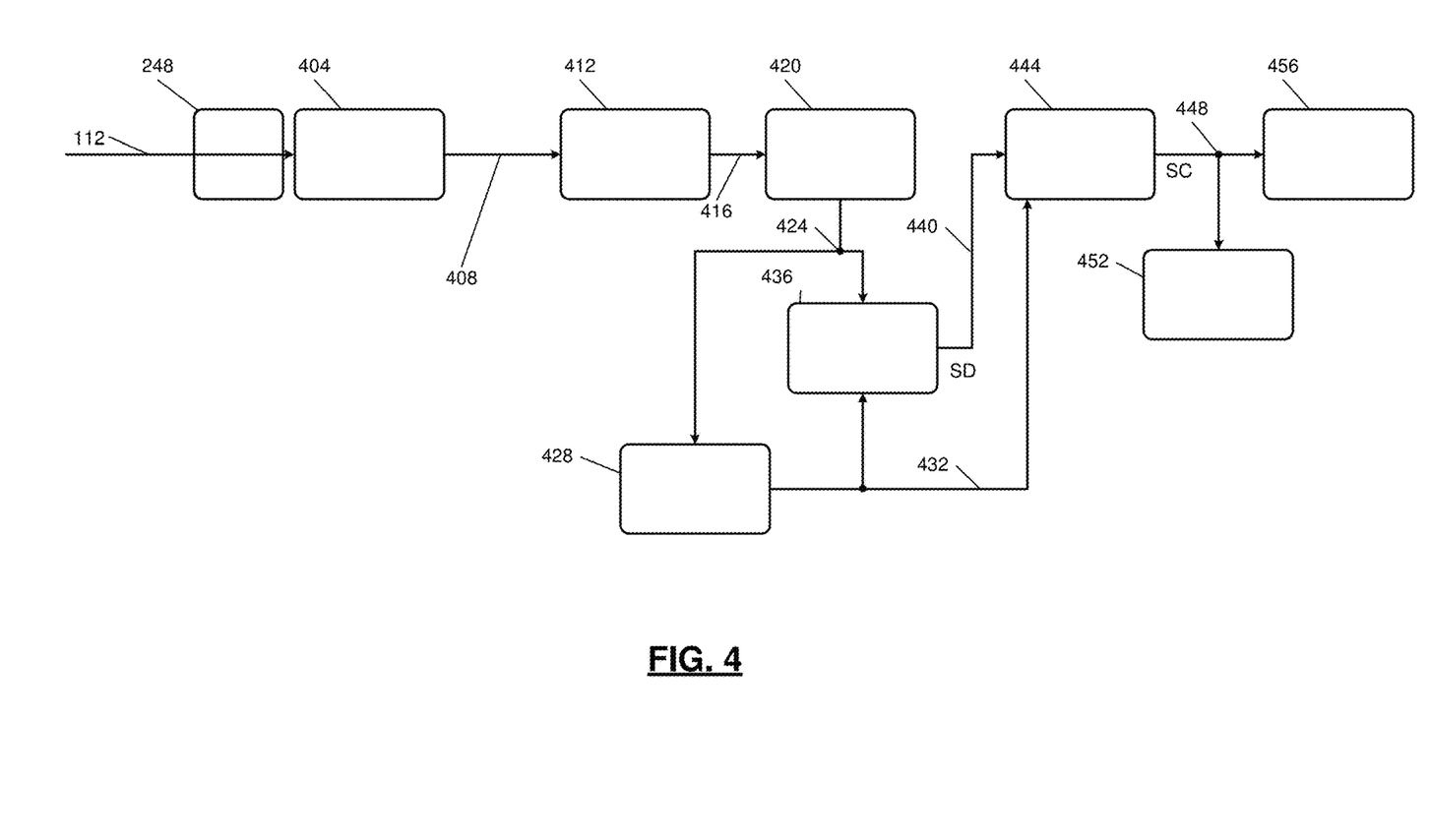
FIG. 4 is a functional block diagram of an example speckle contrast determination system.

FIG. 4 is a functional block diagram of an example speckle contrast determination system. As discussed above, the HUD system 200 displays the hologram 112 through the eye box 248. An imaging colorimeter 404 is positioned such that the hologram 112 generated is within a field of view (FOV) of the imaging colorimeter 404.

The HUD control module 216 controls the HUD system 200 to generate the predetermined hologram for the speckle contrast determination. An example illustration of the predetermined hologram is illustrated at 504 in FIG. 5. While an example of the predetermined hologram is provided, the present application is also applicable to other holograms.

Figure 5:
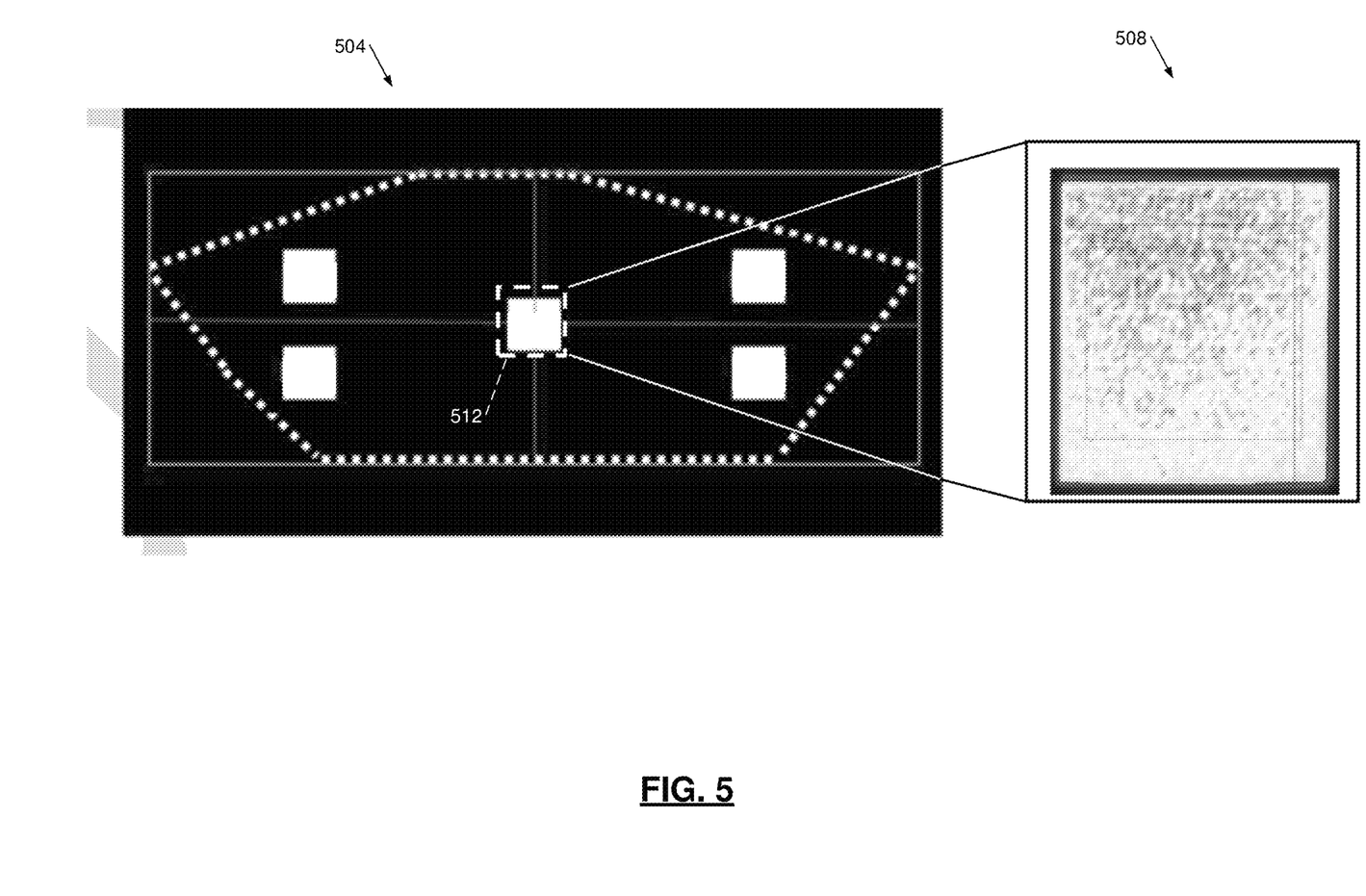
FIG. 5 includes an example illustration of a predetermined graphic, image, or hologram that can be displayed for speckle contrast determination.

The predetermined hologram may be, for example, displayed in monochrome green (e.g., using only the green laser 204-G). Monochrome green may have the brightest intensity and provide better speckle contrast measurement than other colors of light. In various implementations the predetermined hologram may be displayed in another color, such as red, blue, white, or combinations of one or more colors.

Speckle in the hologram results from constructive and deconstructive light interference. An example illustration including speckle is illustrated at 508 in FIG. 5.

The imaging colorimeter 404 captures an image 408 of the predetermined hologram displayed by the HUD system 200. A region of interest (ROI) module 412 determines a region of interest (ROI) 416 in the image 408. The ROI 416 may be a feature at or near a center of the image 408. An example of the ROI 416 is illustrated by 512 in FIG. 5. The ROI module 412 provides the ROI 416 of the image 408 to an intensity module 420. The ROI 416 includes a plurality of pixels. The ROI module 412 may identify the ROI 416, for example, based on pixels within the ROI 416 being brighter than surrounding pixels.

The intensity module 420 measures intensities 424 of the pixels, respectively, of the ROI 416. In various implementations, the intensity module 420 may determine the intensities 424 of bins of pixels, respectively. The bins may be, for example, 1×1 bins (individual pixels), 2×2 bins (2 pixels by 2 pixels), 3×3 bins, 4×4 bins, etc.

Figure 6:
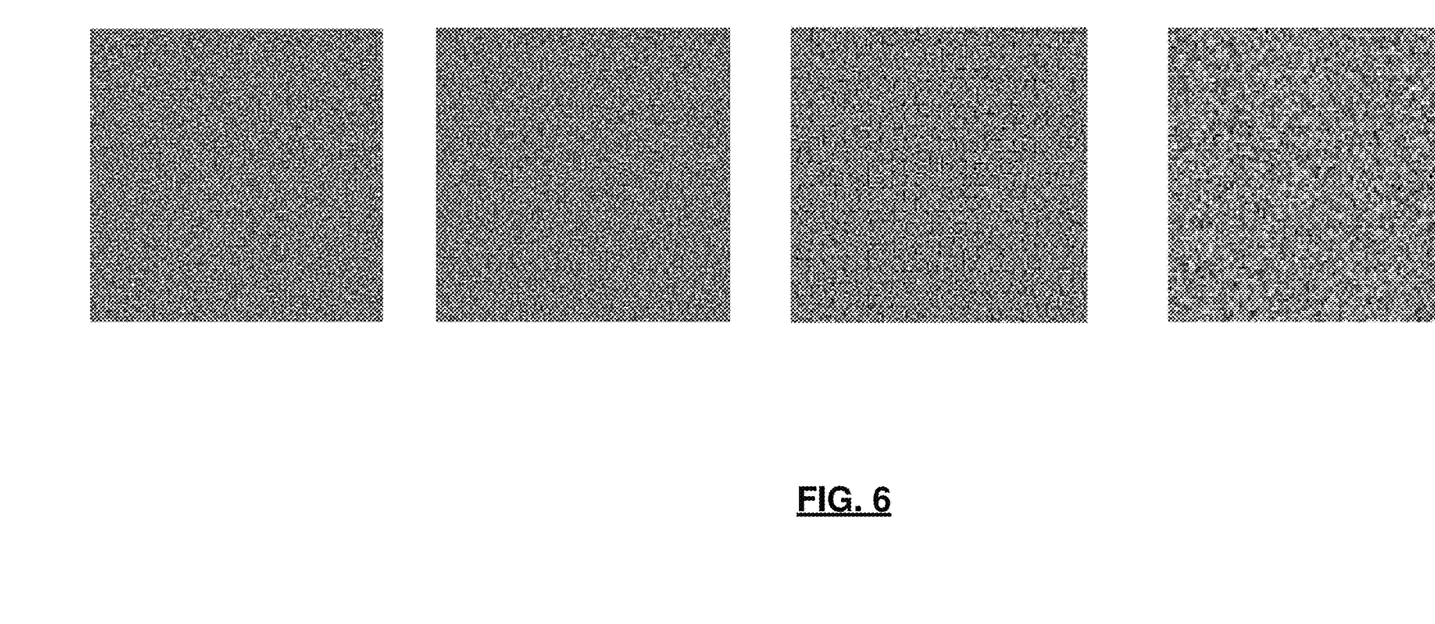
FIG. 6 includes example illustrations of pixel binning.

FIG. 6 includes an example graph of intensities with increasing bin size moving rightward. Increasing the bin size to greater than a predetermined size, however, may decrease accuracy of the speckle contrast and may artificially decrease speckle contrast, which is discussed further below. When the PPD of the imaging colorimeter (or camera) is less than 2.2 times greater than the PPD of the HUD system, the captured image can be considered as having binning performed. The PPD of the imaging colorimeter is to be at least 2.2 times more than the PPD of the HUD system for accurate speckle contrast determination.

An averaging module 428 determines an average intensity 432 of the pixels of the ROI 416 based on the intensities 424. The averaging module 428 may set the average 432, for example, based on or equal to a sum all of the intensities 424 divided by a total number of the intensities 424 summed.

A standard deviation (SD) module 436 determines a standard deviation (SD) 440 of the intensities 424. The SD module 436 may set the SD 440 based on or using the equation:

$$SD = \sqrt{\frac{\sum (x_i - u)^2}{N}},$$

where SD is the SD 440, $x_i$ is the intensity of an i-th pixel in the ROI 416, N is the total number of the intensities 424, and u is the average (or mean) intensity 432.

A speckle contrast module 444 determines a speckle contrast (SC) 448 of the HUD system 200 based on the average intensity 432 and the SD 440. For example, the speckle contrast module 444 may set the SC 448 based on or equal to the SD 440 divided by the average intensity 432.

One or more actions may be taken based on the SC 448. For example, the speckle contrast module 444 may store the SC 448 in memory 452. In various implementations, the speckle contrast module 444 may store an indicator in the memory 452 of whether the SC 448 is greater than a predetermined value. For example, the speckle contrast module 444 may set the indicator to a first state when the SC 448 is greater than the predetermined value and to a second state when the SC 448 is less than the predetermined value. The predetermined value may be calibrated and may be, for example, 0.02 or another suitable value. Speckle contrast less than or equal to the predetermined value may be minimally or non-perceptible by human eye.

Additionally or alternatively the diffuser 240 may be moved (e.g., adjusted or vibrated) when the SC 448 is greater than the predetermined value. An example way of moving the diffuser 240 to reduce speckle contrast is described in Kubota S, Goodman J., "Very Efficient Speckle Contrast Reduction Realized By Moving Diffuser Device", Appl. Opt. 2010; 49(23): 4385-4391, which is incorporated herein in its entirety. The adjustment may be manual or automatic by an adjustment module 456. Additionally or alternatively, one or more surface characteristics of the diffuser 240 may be adjusted when the SC 448 is greater than the predetermined value. The adjustment may be manual or automatic by the adjustment module 456. Additionally or alternatively, the laser control module 208 and/or the modulator control module 228 may adjust control of one or more of the lasers 204 and/or one or more of the spatial light modulators 224 to implement a speckle reduction algorithm when the SC 448 is greater than the predetermined value. One example includes increasing a frame rate of the lasers 204 and the spatial light modulators 224. Examples of speckle reduction measures that can be taken to reduce speckle contrast can be found, for example, in U.S. Pat. No. 10,805,529, and U.S. patent application Ser. No. 17/004,249, which are incorporated herein in their entireties.

Figure 7:
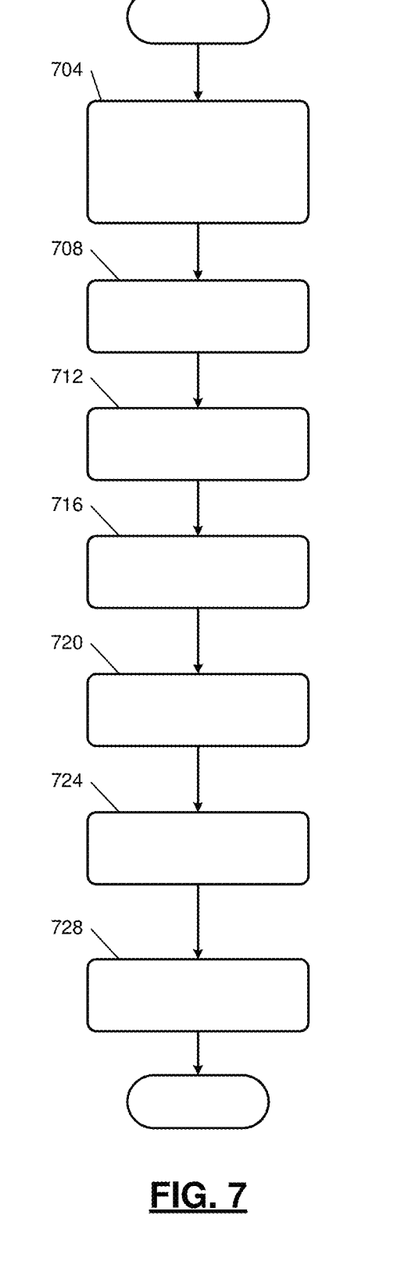
FIG. 7 is a flowchart depicting an example method of determining speckle contrast of a HUD system.

FIG. 7 is a flowchart depicting an example method of determining speckle contrast of a HUD system. Control begins with 704 where the HUD control module 216 controls the HUD system 200 to output the predetermined hologram, such as using only monochrome green. The HUD control module 216 may control the HUD system 200 to output the predetermined hologram with a predetermined luminance, such as 1400 cd/m2 or another suitable luminance.

At 708, the imaging colorimeter 404 captures the image 408 of the predetermined hologram. The imaging colorimeter 404 has a PPD that is at least 2.2 times greater than the PPD of the HUD system 200. PPD involves both resolution and size of an image. The imaging colorimeter 404 may capture the image an aperture value of F/8. The imaging colorimeter 404 may have an exposure time of 50 milliseconds (ms).

The above parameters of the imaging colorimeter 404 and the HUD system 200 (e.g., the use of monochromatic green) may ensure constant speckle contrast values at different locations. Parameters different than the above may result in different speckle contrast values in different locations. Using a PPD that is less than 2.2 times greater than the PPD of the HUD system 200 may render different results in different locations.

At 712, the ROI module 412 determines the ROI 416 of the image. The ROI 416 may be, for example, a bright area near or at a center of the image 408. At 716, the intensity module 420 determines the intensities 424 of the pixels, respectively. In various implementations, the intensity module 420 may determine the intensities 424 of bins of pixels, respectively, as discussed above.

At 720, the averaging module 428 determines the average intensity 432 based on the intensities 424. Also at 720, the SD module 436 determines the SD 440 of the intensities 424. At 724, the speckle contrast module 444 determines the SC (value) 448 based on the average intensity 432 and the SD 440. At 728, one or more remedial actions may be taken if the SC 448 is greater than the predetermined value, such as described above, to reduce speckle contrast.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for measuring speckle contrast, the system comprising:
a head up display (HUD) system configured to output a predetermined image and having a first pixels per degree (PPD);
an imaging colorimeter:
having a field of view;
positioned such that the predetermined image is in the field of view;
having a second PPD that is at least 2.2 times greater than the first PPD of the HUD system; and
configured to capture an image including the predetermined image; and
a speckle contrast module configured to determine a speckle contrast of the HUD system based on the image.

2. The system of claim 1 wherein the imaging colorimeter is configured to capture the image using an aperture value of F/8.

3. The system of claim 1 wherein the imaging colorimeter is configured to capture the image using an exposure time of 50 milliseconds (ms).

4. The system of claim 1 further comprising a region of interest (ROI) module configured to determine a ROI in the image,
wherein the speckle contrast module is configured to determine the speckle contrast within the ROI.

5. The system of claim 1 further comprising an intensity module configured to determine intensities of pixels, respectively, within the ROI of the image,
wherein the speckle contrast module is configured to determine the speckle contrast based on the intensities.

6. The system of claim 5 further comprising:
an average module configured to determine an average of the intensities; and
a standard deviation module configured to determine a standard deviation of the intensities,
wherein the speckle contrast module is configured to determine the speckle contrast based on the average and the standard deviation.

7. The system of claim 6 wherein the speckle contrast module is configured to set the speckle contrast based on the standard deviation divided by the average.

8. The system of claim 1 wherein the speckle contrast module is configured to:
determine whether the speckle contrast value is less than a predetermined value; and
store an indicator in memory based on the determination.

9. The system of claim 1 further comprising an intensity module configured to determine intensities of bins of multiple pixels, respectively, within the ROI of the image,
wherein the speckle contrast module is configured to determine the speckle contrast based on the intensities.

10. The system of claim 1 wherein the HUD system is configured to output the predetermined image in one of: only monochrome green; and only another monochromatic wavelength.

11. The system of claim 1 wherein the HUD system includes one or more lasers used to generate the predetermined image.

12. A method for measuring speckle contrast, the method comprising:
by a head up display (HUD) system, outputting a predetermined image, the HUD system having a first pixels per degree (PPD);
positioning an imaging colorimeter such that the predetermined image is in a field of view of the imaging colorimeter,
wherein the imaging colorimeter has a second PPD that is at least 2.2 times greater than the first PPD of the HUD system;
capturing an image including the predetermined image using the imaging colorimeter; and
determining a speckle contrast of the HUD system based on the image.

13. The method of claim 12 further comprising capturing the image using the imaging colorimeter with an aperture value of F/8.

14. The method of claim 12 further comprising capturing the image using the imaging colorimeter with an exposure time of 50 milliseconds (ms).

15. The method of claim 12 further comprising determining a region of interest (ROI) in the image,
wherein determining the speckle contrast includes determining the speckle contrast within the ROI.

16. The method of claim 12 further determining intensities of pixels, respectively, within the ROI of the image,
wherein determining the speckle contrast includes determining the speckle contrast based on the intensities.

17. The method of claim 16 further comprising:
determining an average of the intensities; and
determining a standard deviation of the intensities, wherein determining the speckle contrast includes determining the speckle contrast based on the average and the standard deviation.

18. The method of claim 17 wherein determining the speckle contrast includes setting the speckle contrast based on the standard deviation divided by the average.

19. The method of claim 12 further comprising:
   determining whether the speckle contrast value is less than a predetermined value; and
   storing an indicator in memory based on the determination.

20. The method of claim 12 wherein outputting the predetermined image includes outputting the predetermined image in one of: only monochrome green; and only another monochromatic wavelength.

\* \* \* \* \*